(12) United States Patent  
Gottlieb et al.

(10) Patent No.: US 8,593,015 B2
(45) Date of Patent: Nov. 26, 2013

(54) BATTERY BALANCING SYSTEM

(75) Inventors: Peter Gottlieb, Dobbs Ferry, NY (US); C. Michael Hoff, Boxborough, MA (US); Thomas Farkas, Marlborough, MA (US)

(73) Assignee: A123 Systems LLC, Livonia, MI (US)

( * ) Notice: Subject to any disclaimer, the term of this patent is extended or adjusted under 35 U.S.C. 154(b) by 430 days.

(21) Appl. No.: 12/914,006

(22) Filed: Oct. 28, 2010

(65) Prior Publication Data

US 2012/0104856 A1 May 3, 2012

(51) Int. Cl.
*H02J 1/00* (2006.01)

(52) U.S. Cl.
USPC .......................................................... 307/87

(58) Field of Classification Search
USPC ................... 307/43, 52, 66, 85–87, 130, 150; 320/148–150
See application file for complete search history.

(56) References Cited

U.S. PATENT DOCUMENTS

| | | | |
|---|---|---|---|
| 5,148,042 A * | 9/1992 | Nakazoe | 307/60 |
| 2004/0164706 A1 | 8/2004 | Osborne | |
| 2006/0238033 A1 * | 10/2006 | Raiser et al. | 307/66 |
| 2007/0279003 A1 | 12/2007 | Altemose et al. | |
| 2009/0229288 A1 * | 9/2009 | Alston et al. | 62/236 |
| 2009/0278489 A1 | 11/2009 | St-Jacques | |
| 2009/0325056 A1 | 12/2009 | Greening et al. | |
| 2010/0141209 A1 | 6/2010 | Shiu et al. | |
| 2010/0261043 A1 * | 10/2010 | Kim et al. | 429/61 |
| 2010/0295374 A1 * | 11/2010 | Nielsen et al. | 307/66 |

OTHER PUBLICATIONS

International Search Report and Written Opinion for International Application No. PCT/US11/57852 mailed Feb. 29, 2012. 11 pages.

* cited by examiner

*Primary Examiner* — Jared Fureman
*Assistant Examiner* — Duc M Pham
(74) *Attorney, Agent, or Firm* — Wilmer Cutler Pickering Hale and Dorr LLP

(57) ABSTRACT

A battery system comprises a first battery unit; a DC voltage bus; a second battery unit electrically connected to the DC voltage bus; a current-limiting component; and switching circuitry for connecting the first battery unit to the DC voltage bus, where the switching circuitry is configured to electrically connect the first battery unit to the DC voltage bus either directly or through a current-limiting component, depending on an operating parameter of the first battery unit.

17 Claims, 4 Drawing Sheets

BATTERY BALANCING SYSTEM

TECHNICAL FIELD

This disclosure relates to energy storage systems, and specifically to the management of energy storage systems having multiple battery cells.

BACKGROUND

Electric utility companies can use large groups of individual battery cells to store and provide electrical energy within power generation and distribution grids. The battery cells are installed and managed inside a battery station. The power companies use the battery station's electrical storage capacity to stabilize and regulate their power grids, such as by allowing energy generated at one point in time to be used during another. Intelligent management of this storage capacity can help realize a "smart grid" by creating more efficient, flexible, and secure power networks. Possible environmental benefits of smart grids include conservation of energy, as well as improvements in the ability to use cleaner energy alternatives.

In addition to battery cells, battery stations have other subassemblies and components installed inside them in order to deliver complete energy management systems to electric utility companies. These subassemblies and components include communication devices, electronic sensor modules, electronic control modules, electrical charging modules, electrical interface connectors, electric fuses, bus bars, inverters, electrical wiring harnesses, and thermal management means.

OVERVIEW

In general, in one aspect, a battery system comprises a first battery unit; a DC voltage bus; a second battery unit electrically connected to the DC voltage bus; a current-limiting component; and switching circuitry for connecting the first battery unit to the DC voltage bus, where the switching circuitry is configured to electrically connect the first battery unit to the DC voltage bus either directly or through a current-limiting component, depending on an operating parameter of the first battery unit.

Other embodiments include one or more of the following features. The first battery unit contains a first plurality of battery cells and the second battery unit contains a second plurality of battery cells. The operating parameter is a voltage difference between the first battery unit and the DC voltage bus. The current-limiting component is a resistor, an inductor, or a switched-mode power converter. The switching circuitry is further configured to selectively allow current to flow either into or out of the first battery unit.

Certain embodiments also include a first switch, where the first switch is electrically connected in series with the current-limiting component; and a second switch, where the second switch is electrically connected in parallel with the series combination of the first switch and the current-limiting component, and where the switching circuitry is further configured to electrically connect the first battery unit to the DC voltage bus through the current-limiting component by closing the first switch and opening the second switch. Certain other embodiments include a thermal sensor, where the thermal sensor is in thermal contact with the current limiting device, and operably connected to the switching circuitry; where the switching circuitry is further configured to electrically disconnect the first battery unit from the DC voltage bus in response to the thermal sensor sensing that the current limiting device is above a threshold temperature.

In general, in another aspect, a method of connecting a battery unit comprises determining that a first battery unit is to be connected to a DC voltage bus, where the DC voltage bus has an existing connection to a second battery unit; determining an operating parameter of the first battery unit; and electrically connecting the first battery unit to the DC voltage bus either directly or through a current-limiting component, depending on the operating parameter of the first battery unit.

Other embodiments include one or more of the following features. The first battery unit contains a first plurality of battery cells and the second battery unit contains a second plurality of battery cells. The operating parameter is a voltage difference between the first battery unit and the DC voltage bus. The current-limiting component is a resistor, inductor, or a switched-mode power converter. The switching circuitry is further configured to selectively allow current to flow either into or out of the first battery unit.

Certain embodiments further comprise determining that the difference in voltage between the first battery unit and the DC voltage bus is lower than a threshold voltage; and in response to the determination that the difference in voltage between the first battery unit and the DC voltage bus is lower than a threshold voltage, removing the current-limiting component from between the first battery unit and the DC voltage bus and replacing it with a direct electrical connection. Other embodiments further comprise determining that the temperature of the current-limiting device is above a threshold; and in response to the temperature determination, electrically disconnecting the battery unit from the DC voltage bus. Yet other embodiments further comprise determining that the temperature of the current-limiting device is below a threshold; and in response to the temperature determination, electrically reconnecting the battery unit to the DC voltage bus.

BRIEF DESCRIPTION OF THE FIGURES

For a fuller understanding of the nature and objects of the present disclosure, reference should be made to the following description of example embodiments taken in connection with the accompanying drawings in which the same reference numerals are used to indicate the same or similar parts wherein.

DESCRIPTION OF EXAMPLE EMBODIMENTS

A battery station is a collection of a large number of individual battery cells that are arranged and managed together to provide a system that acts as a single large-capacity battery suitable for use with a utility company's power grid. During periods when the power grid is supplying large amounts of electrical power, such as during the middle of a hot day when residential users are running air-conditioning, a battery station can act as a reserve source of electricity. Later in the day, when the power demands on the grid are lower, the battery station can recharge itself from the grid using available power. This helps regulate the power grid, and allows energy generated at one point in time to be used during another. For example, wind power generated at night can be used during the day, or solar power generated during sunny periods may be preserved for cloudy periods. The battery station may also be used to correct frequency and/or phase errors within the power grid.

The Battery Station

Figure 1:
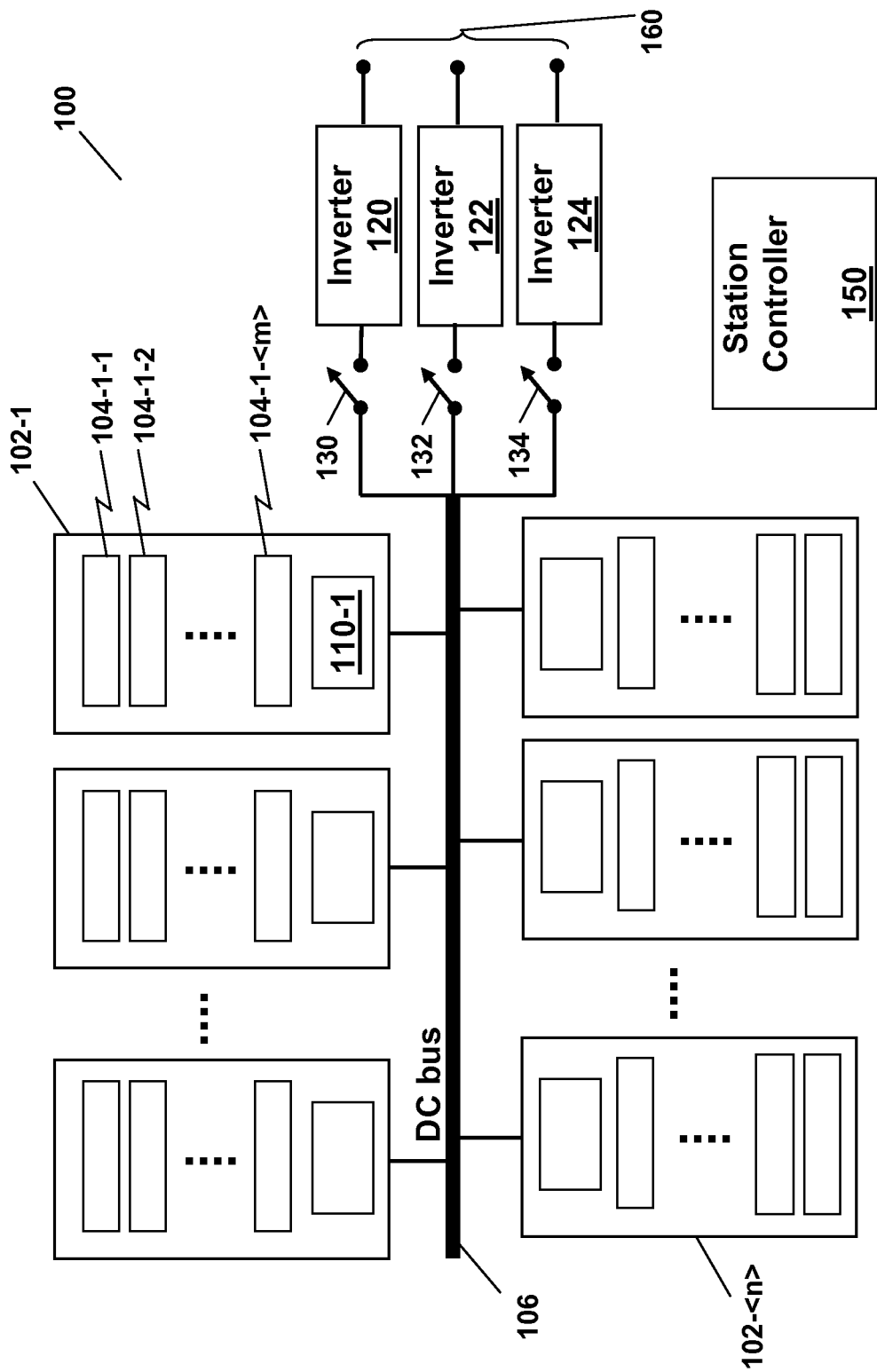
FIG. 1 shows a battery station in accordance with certain embodiments.

As shown in FIG. 1, battery station 100 consists of <n> battery racks 102-1 to 102-<n> connected in parallel to a common DC (direct current) power bus 106. Each battery rack acts as a unit within the battery station, and contains rack-mounted groups of batteries arranged within replaceable trays mounted in the rack. For example, battery rack 102-1 contains <m> battery trays 104-1-1 through 104-1-<m>, as well as a rack controller 110-1, which is also configured as a replaceable tray. Typically, each rack is identical to each other rack, and each battery tray is identical to each other tray. As described in more detail below, each battery tray 104 contains a number of individual battery cells (not shown). The cells are arranged in modules and electrically connected to the other cells in the tray to form the energy storage for the tray. The total energy storage of all of the rack's trays makes up the energy storage capacity of the rack itself. One implementation of a battery station has 18 racks, with 8 trays per rack, and 6 modules per tray, with 96 battery cells per module (wired as 12 batteries in series by 8 in parallel), for a total of 82,944 cells. With the use of integrated intelligent control components that can communicate with the rest of the power grid, this station functions as a single "smart" multi-megawatt battery. Multiple battery stations may be used together to provide additional energy storage capacity.

The battery station has several layers of internal controls, each of which interoperates with the other layers. Each rack controller 110 is in communication with each of the trays in the rack, and with a central battery station controller 150. Station controller 150 manages the station as a whole, and is connected to a communication network outside of the battery station to allow for remote management of the station and coordination with other stations. The battery station includes built-in environmental regulation (not shown) for cooling/heating in the station which also is controlled and monitored by station controller 150.

Battery racks 102-1 to 102-<n> are selectively connected via switches 130, 132, and 134 to a set of DC-to-AC inverters 120, 122, and 124 through DC bus 106. The inverters convert DC power at a nominal voltage (e.g., 960 volts) on the DC bus 106 to a three-phase alternating current (AC) available at output 160. Output 160 (e.g., 480 volts) is usually connected to the distribution system of a power utility company through one or more step-up transformers (not shown). The inverters may each be implemented as individual inverters, or a combination two or more inverters in parallel to allow for redundancy and automated failover, and/or to allow for a higher power output than a single inverter could produce.

The DC bus 106 of the battery station has both a positive and a negative conductor (not shown), and each battery rack has a positive and a negative terminal connected to the respective conductors of the DC bus. The DC bus 106 acts as a shared, common connection point for the battery racks. However, the terminals of the racks are not permanently connected to the DC bus. Instead, a rack uses controllable air gap switches to connect the positive and negative terminals of the rack to the positive and negative conductors of the DC bus so that the rack can receive or provide electrical power. The use of open air gap switches such as relays provide additional safety over solid state switches because the air gap provides an additional physical separation in the event of a failure. Racks also have one or more safety fuses in series with one terminal to prevent the current to/from the rack from going too high.

A battery rack 102-1 in a battery station has a rack controller 110-1 that monitors and controls the operation of the rack, including the rack's connection to the DC bus. The rack controller provides a battery management system (BMS) that has the capability under software control to recover from problems that the rack may encounter. The BMS can be instructed remotely, for example, to disconnect and shut down a failed battery tray in the rack and then recharge and configure a replacement tray when one is installed. The BMS, in conjunction with the station controller 150, can also report on problems, send notifications, and allow for ad-hoc monitoring of the rack.

One feature of controller 110-1 is the ability to disconnect its associated rack from the DC bus 106 (and thus from the remaining battery racks) in the event of a problem in the individual rack's operation. Using the controller, a rack can decide independently to disconnect itself due either to temporary problems or more serious failures, or it can be instructed to do so by the station controller for related reasons. This can prevent problems such as high or low cell voltages in any one of the batteries contained within the rack from negatively affecting the operation of the rest of the cells/racks in the station, and from operating in a way that could jeopardize the safety of the overall station. Such high/low voltages can be due, for example, to an imbalance in state of charge and/or capacity between the cells in the system. Other problems include a failure in the rack, such as a short circuit, over-temperature, or over-current event.

For example, a rack whose temperature has risen above some threshold may choose to take itself offline and disconnect its output terminals from the DC power bus to protect the battery cells. Doing so reduces the total energy storage capacity of the station, but gives the rack a chance to stop providing power for long enough to cool down. The rack controller can subsequently reconnect itself to the DC bus once the rack or some other controller in the battery station determines the rack is capable of operating within the expected temperature range. Another temporary condition during which a rack might take itself offline would be a temporary loss of communication between the rack and the system controller.

Even when a rack is offline, it can still consume the energy stored in its battery cells. This is because the rack uses its own batteries to provide electrical power to loads within the rack such as to battery monitoring boards/controllers in the trays, and possibly to one or more cooling fans and/or the rack controller. This offline discharge may cause the voltage of the offline rack to drop below the voltages provided by the other racks in the station, and thus below the voltage of the DC bus. This can create several potential problems.

If the voltage of the offline rack is at, e.g., 500 volts, and the rest of the racks are outputting 900 volts, connecting the low-voltage rack to the DC bus may cause a large electrical current to the low-voltage rack. This could overload the low-voltage rack, and possibly damage it and/or its connection to the DC bus. For example, the current could blow a fuse within the rack. Even if the rack can handle the current, connecting it to the bus may bring the overall bus voltage so low (e.g., below 700 v) that the inverters fail to work. Another potential problem is electrical arcing at the switches that connect the rack to the DC bus, possibly causing the switches to weld closed with a resulting loss of control over the rack and/or the station.

A related problem can occur when a previously-offline rack still retains a high relatively voltage, but the energy in the remaining racks has dropped due to experiencing a high demand for energy while the high-voltage rack was offline. This can create a problem of too large a current from the higher-voltage battery to the DC bus when the previously-offline rack reconnects to the bus, with all of the potential problems described above.

One solution to the problem of a discharged rack is to "pre-balance" the low-voltage battery rack by connecting it to a portable charging system. In this way, the rack is brought back up to an appropriate voltage level before it is allowed to reconnect to the common DC bus and charge and/or balance its voltage to the levels of the rest of the racks in the battery station. Another solution is to shut the entire system down, connect the lowest voltage rack, and then bring it up to the voltage of the next-lowest rack using power through the DC bus from the outside power grid or another source. Next, those two racks (now close to or equal in voltage) are brought up to the next lowest rack's voltage, and so on until the entire system is up and running. But these shutdowns are time consuming and disruptive. The embodiments described herein provide an alternative solution, namely, a rack balancing system that manages the connection of a low-voltage or high-voltage rack to the rest of the system.

The Battery Rack and Balancing

Figure 2:
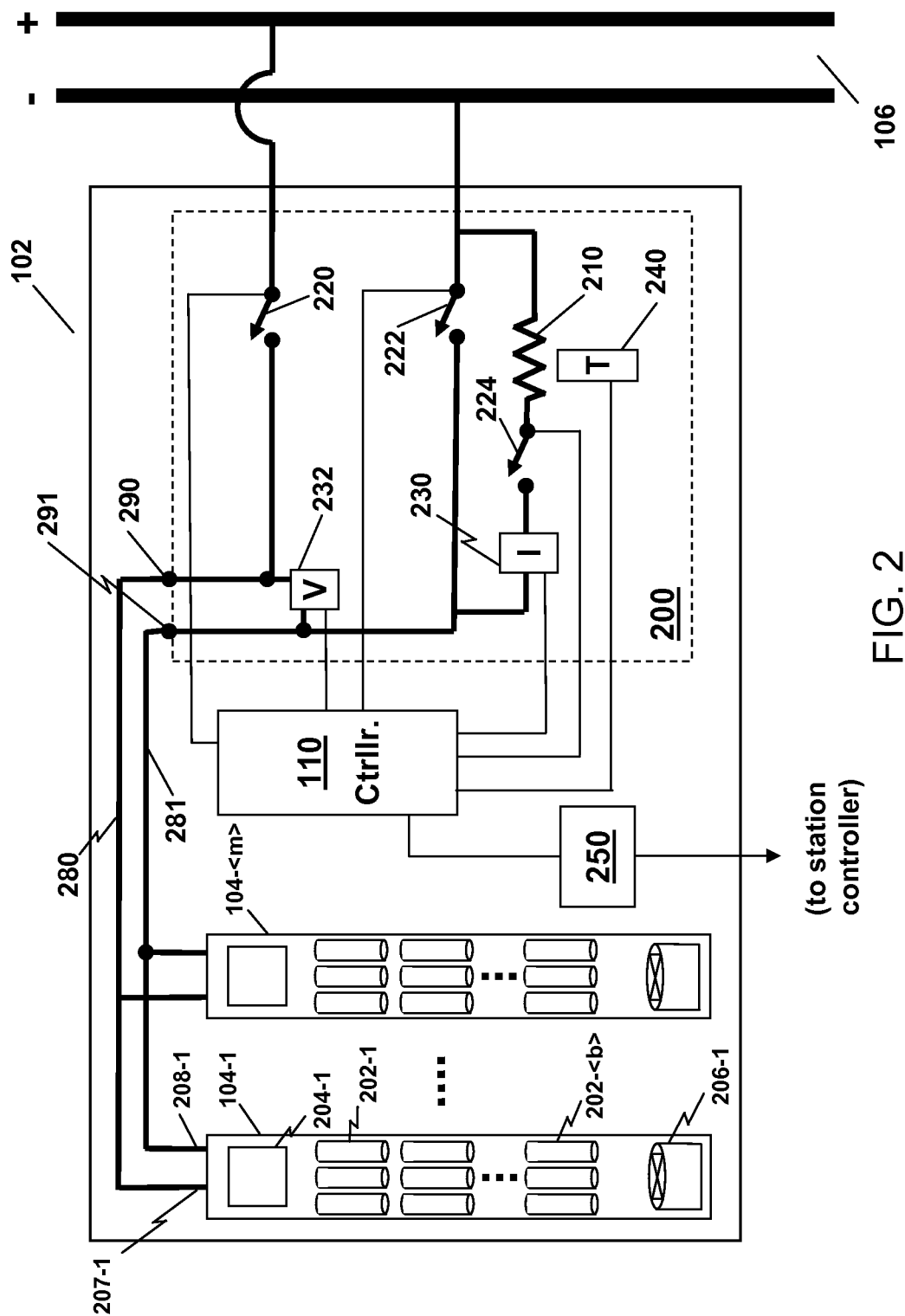
FIG. 2 shows a battery rack of a battery station in accordance with certain embodiments.

FIG. 2 shows an embodiment of a battery rack 102-1 with a rack balancing system. Battery rack 102 contains <m> battery trays 104-1 through 104-<m>, rack controller 110, rack interface 250, and connecting unit 200. Battery tray 104-1 contains fan unit 206-1 as well as <b> battery cells 202-1 through 202-<b>. Within each tray, the individual battery cells are arranged in groups called modules (not shown). These modules are electrically connected in series and/or parallel to each other to produce a desired voltage for the tray as a whole. Battery tray 104-1 provides its power onto the rack's DC bus via terminals 207-1 and 208-1. A battery tray may also contain a tray controller 204-1 responsible for managing the individual tray and communicating with rack controller 110. Tray controller 204-1 is also connected to and controls fan 206-1 or other thermal management means within the tray. Tray controller 204-1 can connect or disconnect the tray from the rack's internal DC bus, which comprises a positive conductor 280 and a negative conductor 281. Alternatively, the functions of the tray-level controller 204-1 may be performed from outside the tray without the use of a separate tray-level controller.

The rack's internal DC bus presents two internal terminals, 290 and 291, to connecting unit 200 which manages the rack's electrical connection to and disconnection from the bus. Rack controller 110 implements logic to control connecting unit 200, and causes the connecting unit to selectively connect and disconnect the rack's internal terminals to the battery station's main DC bus 106. Rack controller 110-1 is in communication with interface 250, which communicates with station controller 150 (not shown). This allows the rack controller to communicate and coordinate its operations with the station controller. Rack controller 110 is also in communication with each of the battery trays 104-1 through 104-<n>.

The rack controller may manage and monitor each battery tray directly or through a tray controller (e.g., 204-1) in each battery tray. Rack controllers are implemented with one or more programmed micro-controllers, micro-processors, or as custom ASICs (application-specific integrated circuits). The logic controlling the connecting unit 200 may be implemented in software, firmware, in an ASIC, or any combination of the three. The logic may be part of rack controller 110, or a separate controller component in communication with rack controller 110, such as station controller 150. The station controller 150 can be implemented in similar ways.

Connecting unit 200 includes a current-limiting component shown in FIG. 2 as resistor 210. Through the use of switches 222 and 224, resistor 210 may be selectively placed in series between a battery rack 102 (whose voltage is either too high or too low) and DC bus 106. This current-limiting component allows the terminals within the battery rack to be selectively connected to the DC bus 106 while also limiting the size of the resulting current. Connecting unit 200 also includes a temperature sensor 240, and a current monitor 230, both of which are connected to rack controller 106. Switches 220, 222, and 224 are connected to and controlled by rack controller 106, using the logic described below. Resistor 210 is chosen to allow a sufficient amount of current between the rack 102 and the DC bus 106 to promote relatively quick charging/discharging, while still limiting the current to safe levels for the rack, its connecting components, and the rest of the battery station. The switches 220, 222, and 224 are chosen to safely support the expected current levels flowing through them, which for switch 224 (in series with the current-limiting component), may be lower than the maximum currents expected through the other switches.

Rack Reconnect Logic

Figure 3:
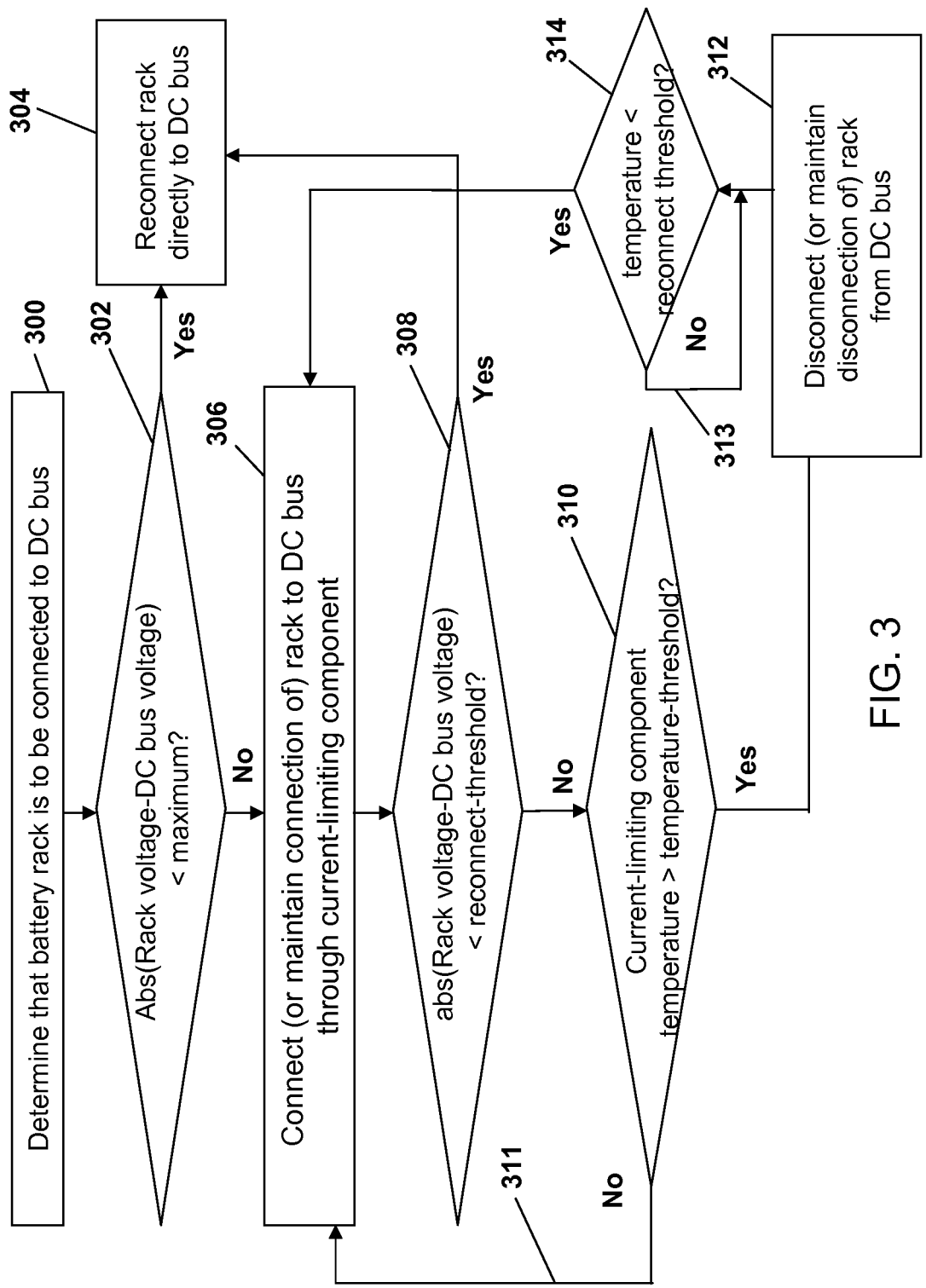
FIG. 3 shows a flowchart for managing a battery subunit in accordance with certain embodiments.

FIG. 3 shows a flowchart for implementing rack balancing in conjunction with rack 102, shown in FIG. 2. The logic in this flowchart can be used for balancing (recovering) from either high or low rack voltage scenarios. First, in step 300, the rack controller 110 decides, to reconnect the rack to the DC bus 106. This decision may have been made either by the rack on its own or as instructed by the station controller 150. Prior to this connection, switches 220, 222 and 224 would have been open, effectively disconnecting the rack from the DC bus. In preparation to reconnect, in step 302, the rack controller compares the voltage of the rack 102 to the voltage of the DC bus 106. Station controller 150 monitors the state of the DC bus in the station and can provide this information to the rack controller 110. Alternatively, the rack controller may determine the DC bus voltage itself. The rack's voltage may be measured by rack controller 110 as an actual value through voltage sensor 232 or estimated based on earlier measurements including voltage, time, current, and the status of the individual cells and modules within the rack.

In step 302, if the absolute difference between the rack voltage and the DC bus voltage is below a certain threshold amount, rack controller 110 will connect the rack back to the DC bus in step 304 by closing switches 220 and 222 and keeping switch 224 open, effectively keeping the resistor from being included in the connection between the rack and the DC bus. If the difference is too large, in step 306, controller 110 will close switches 220 and 224 and maintain switch 222 in an open position so that the resistor is electrically inserted in series between the DC bus and the rack's battery cell. In the latter situation, the resistor acts to limit the current, e.g., to a few amps. Alternatively, an operating parameter of the rack other than the voltage may be used to determine whether to insert the current limiting-component. At step 308, the logic periodically determines whether the difference between the rack and the DC bus has dropped below some threshold. At some point after the voltage of the rack has come to within a certain proximity to the voltage of the DC bus, such that the resistor is no longer necessary to reduce the current, controller 110 closes switch 22 and opens switch 224 (step 304). This effectively withdraws the current-limiting component from between the rack and the DC bus, and replaces it with a direct connection. At that point, without the intervening resistor in the circuit, the rest of the battery station can more quickly charge (in the case of a low-voltage rack) or discharge (in the case of a high-voltage rack) the battery to make up for any remaining difference in charge. Alternatively, or in addition to monitoring the voltage difference between the rack and the DC bus, the current between the two may be monitored and used as a basis to determine if the current-limiting component should be inserted into the circuit.

The reconnect process may also accommodate the thermal characteristics of resistor 210. Given the currents and voltages involved in some battery stations, the resistor may heat up during balancing to the point where the balancing must be temporarily suspended to allow it to protect the resistor and cool down. To accomplish this, in step 310, controller 110 monitors the temperature of the resistor using sensor 220. If the rack controller 110 determines that the temperature of the resistor is above a threshold, controller 110 disconnects the rack from the DC bus 106, either by opening switch 224, and/or opening switch 220 (step 312). Later, in step 314, after the temperature of the resistor has fallen below another threshold or possibly after a certain period of time, the rack is reconnected to the DC bus as in step 306. The monitoring of voltage difference and/or resistor current forms part of processing loop 311, which may also include processing loop 313.

The voltage and/or current thresholds may be chosen so that the controller operates with hysteresis. In other words, the resistor 220 will remain connected for a period of time even as the current drops below the maximum. This prevents rapid switching in and out as the current nears the limit. The controller logic can switch in the current-limiting resistor whenever the rack determines that its voltage is more than 10 volts away from the voltage of the DC bus, and keep the resistor in series with the rack until the difference is less than 8 volts.

The logic described above will also work to limit the currents in scenarios where the rack has too high a voltage in comparison to the DC bus. Alternatively, the connecting unit 200 may be configured to use the resistor as a dummy load in situations where the rack has too high a voltage. In this scenario, additional controllable switches are added to the connecting unit to allow the resistor 210 to be placed across terminals 290 and 291 while the rack is otherwise disconnected from the DC bus 106.

Controller 110 monitors the current going through resistor 210 (both during recovery/balancing operations, and also during normal operations) by using a current monitor 230. Alternatively, the current between the rack and the DC bus may be monitored elsewhere in the rack. If the current exceeds appropriate limits, controller 110 may also suspend or halt the balancing process by opening one or more of the switches 220, 222, and/or 224 to stop the flow of current.

Rack controller 110 communicates with station controller 150 so that balancing and rack charging/discharging operations are performed at appropriate times. In this way, the station can schedule these operations to avoid interrupting the operational requirements being placed on the rest of the battery station.

Battery Rack Components

Resistor 210 is mounted so that the heat it generates when in use is appropriately dissipated. Thermal management can be provided by mounting the resistor in a thermally-conductive manner to the chassis of the rack or a battery tray so that the chassis is used as a heat sink for the resistor. A separate heat sink may be used. The resistor is mounted so that it is the last component in the airflow (or near to last) so that other components in the rack are not adversely affected by the use of the resistor. In this way, the most heat sensitive components get the coolest air, and as they heat the air, the last thing in the airflow is the resistor.

The following parts may be used in connecting unit 200:

| Component | Part |
| --- | --- |
| Resistor 210 | Ohmite L225J250E, 250 ohm, 225 Watt ceramic resistor from Bishay Dale |
| Switches 220, 222, 224 | Tyco Electronics Kilovac Czonka III Relay P/N EV200AAANA (a lower current-rated relay may be used for switch 224 if the total current through it will be less than for switches 220 and 222.) |
| Thermal sensor 240 | Klixon thermal switch |

Figure 4:
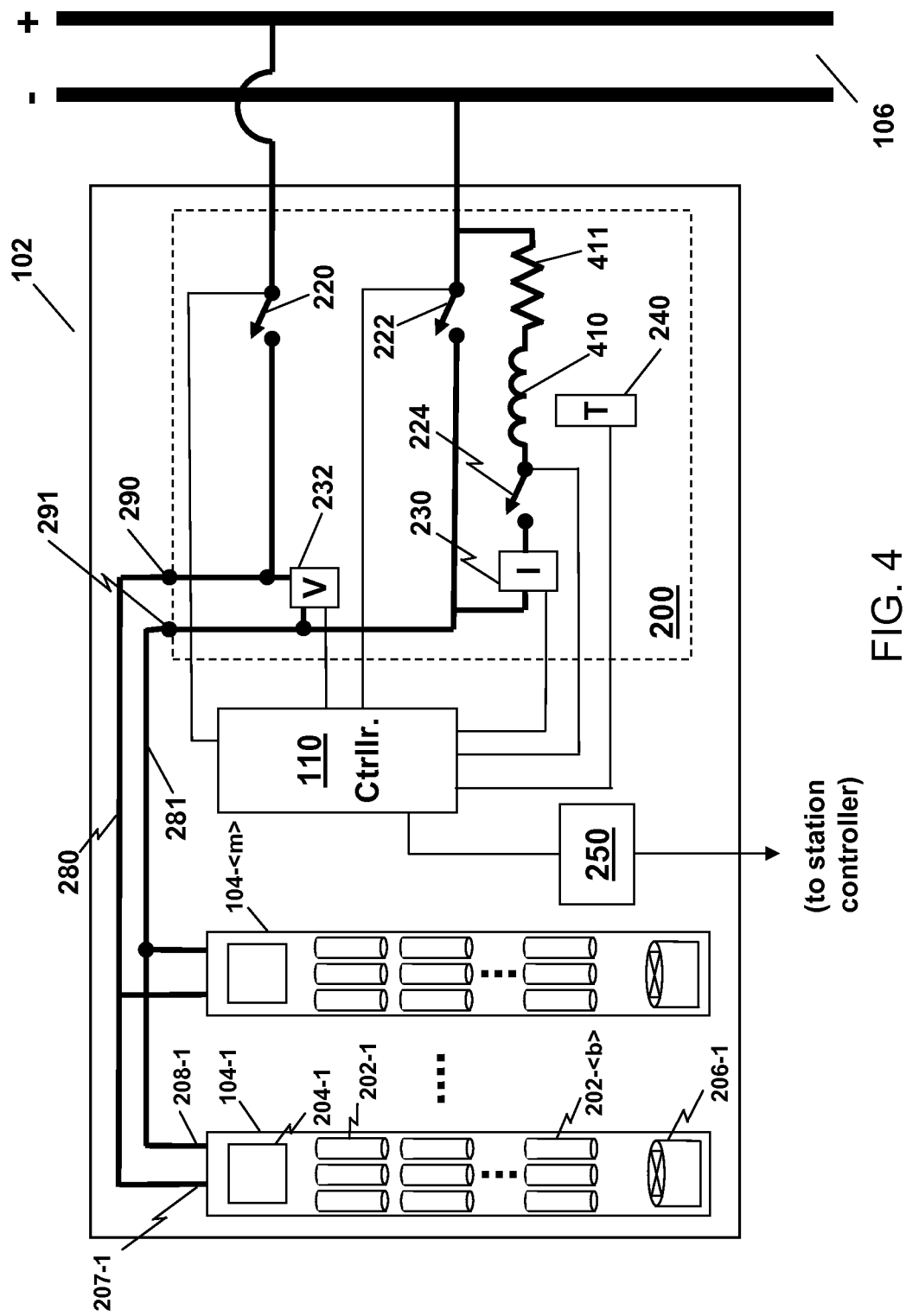
FIG. 4 shows a battery rack of a battery station in accordance with certain embodiments.

FIG. 4 shows an alternative embodiment where an inductor 410 is used in place of resistor 210 to implement a current-limiting component in connecting unit 200. Inductor 410 and switch 224 are placed in series with a relatively small resistor 411. Alternatively, the inductor's own internal series resistance may be used instead of an external resistor. In the latter case, the internal resistance is represented by resistor 411. The other components of FIG. 4 are the same as for FIG. 2.

Because inductor 410 is placed in series between the rack and the DC bus, it acts to resist sudden changes in electric current. Thus, the inductor prevents arcing at the switches connecting the rack to the DC bus by spreading the rise of current into or out of the rack over a period of time, typically a few milliseconds. When the rack voltage and the DC bus voltage are too far apart to safely connect, switch 222 is held open while switches 220 and 224 are closed. The current in the inductor is initially zero, so switch 224 switches into no current. The inductor current through 410 rises over time, and its rate of rise is roughly determined by the difference between voltage of the DC bus and the rack. As the inductor current rises, the rack voltage approaches the DC bus voltage as a function of the inductor current and the battery's internal resistance. When the rack voltage and the DC bus voltage are close enough to each other, switch 222 closes, incurring a minor spike of current through switch 222. Switch 222 is chosen so as to safely handle any such current spike. At this point in time, the inductor current steadily decreases as determined by its current and any series resistance in its path, such as resistor 411, whether resistor 411 is intrinsic to inductor 410 or provided externally. Accordingly, the current flow may be higher in this embodiment than in the embodiment using a resistor current-limiter.

When the inductor current is reduced to a safe threshold at which switch 224 can safely opened (e.g., without any arcing), controller 110 opens switch 224. Capacitors, snubbers or other devices, can safely damp any voltage spikes that occur across switch 224 when it opens. The safe thresholds of the difference in voltage between the rack and the bus, as well as maximum residual inductor current, are determined by the designed capability of the switching devices and associated wiring. The value of resistor 411 is chosen to be small in comparison to the internal resistance of the battery rack. Otherwise, the rack voltage may never get close enough to the DC bus voltage to allow switch 222 to close. If this happens, the rack voltage will gradually approach the DC bus voltage as its state of charge gets closer to the state of charge of the other batteries on the bus, essentially acting like the first embodiment of this invention. Additional embodiments include (1) replacing switch 224 and/or other switches with solid state switching devices; and (2) designing the inductor to saturate above a certain current limit in order to rapidly ramp the current through it. In addition, the resistor-based and inductor-based embodiments may be combined by placing a resistor in series with switch 222 in FIG. 4. In this embodiment, the inductor approach can be used for moderate voltage differences between the DC bus and the rack, and the resistor approach for larger differences.

A switched-mode power converter may be used as a current-limiting component in place of resistor 210. Such converters use pulse-width or other forms of modulation to control the rate of power transferred between the DC bus 106 and the rack 102. This control can be digital or analog, and may be under the control of rack controller 110. A linear regulator could also be used to regulate the current between the rack and the DC bus.

A current-limiting component may also be applied to limit current to/from groups of racks, instead of just individual racks. For example, a 32 megawatt hour system has multiple rows of racks of batteries. In addition to having balancing capabilities within individual racks, an entire row could be protected with a current-limiting component so that the row of racks could be balanced in a current-limited manner as it is connected to the remainder of the system. In this case, the current limiter would be sized appropriately for the larger currents at the row level, and the switches between the row and the rest of the system may be motorized switches capable of switching larger currents than those going to individual racks. The current-limiting component would be placed in series between the row of racks and the DC power bus in an analogous manner to when the component is used to limit current to just one rack.

What is claimed is:

1. A battery system comprising:
   a first battery unit;
   a DC voltage bus;
   a second battery unit electrically connected to the DC voltage bus;
   a current-limiting component; and
   switching circuitry for connecting the first battery unit to the DC voltage bus,
   wherein the switching circuitry is configured to electrically connect the first battery unit to the DC voltage bus either directly or through a current-limiting component, depending on an operating parameter of the first battery unit, wherein the operating parameter is a voltage difference between the first battery unit and the DC voltage bus.

2. The battery system of claim 1, wherein the first battery unit contains a first plurality of battery cells and the second battery unit contains a second plurality of battery cells.

3. The battery system of claim 2, wherein the current-limiting component is a resistor.

4. The battery system of claim 2, wherein the current-limiting component is an inductor.

5. The battery system of claim 2, wherein the current-limiting component is a switched-mode power converter.

6. The battery system of claim 2, further comprising a first switch, wherein the first switch is electrically connected in series with the current-limiting component; and a second switch, wherein the second switch is electrically connected in parallel with the series combination of the first switch and the current-limiting component, wherein the switching circuitry is further configured to electrically connect the first battery unit to the DC voltage bus through the current-limiting component by closing the first switch and opening the second switch.

7. The battery system of claim 2, further comprising a thermal sensor, wherein the thermal sensor is in thermal contact with the current limiting device, and operably connected to the switching circuitry; and
   wherein the switching circuitry is further configured to electrically disconnect the first battery unit from the DC voltage bus in response to the thermal sensor sensing that the current limiting device is above a threshold temperature.

8. A method of connecting a battery unit comprising:
   determining that a first battery unit is to be connected to a DC voltage bus, wherein the DC voltage bus has an existing connection to a second battery unit;
   determining an operating parameter of the first battery unit, wherein the operating parameter is a voltage difference between the first battery unit and the DC voltage bus; and
   electrically connecting the first battery unit to the DC voltage bus either directly or through a current-limiting component, depending on the operating parameter of the first battery unit.

9. The method of claim 8, wherein the first battery unit contains a first plurality of battery cells and the second battery unit contains a second plurality of battery cells.

10. The method of claim 9, wherein the current-limiting component is a resistor.

11. The method of claim 9, wherein the current-limiting component is an inductor.

12. The method of claim 9, wherein the current-limiting component is a switched-mode power converter.

13. The method of claim 9, further comprising determining that the difference in voltage between the first battery unit and the DC voltage bus is lower than a threshold voltage; and
   in response to the determination that the difference in voltage between the first battery unit and the DC voltage bus is lower than a threshold voltage, removing the current-limiting component from between the first battery unit and the DC voltage bus and replacing it with a direct electrical connection.

14. The method of claim 13, further comprising determining that the temperature of the current-limiting device is above a threshold; and in response to the temperature determination, electrically disconnecting the battery unit from the DC voltage bus.

15. The method of claim 14, further comprising determining that the temperature of the current-limiting device is below a threshold; and in response to the temperature determination, electrically reconnecting the battery unit to the DC voltage bus.

16. The battery system of claim 2, wherein the switching circuitry is further configured to selectively allow current to flow either into or out of the first battery unit.

17. The method of claim 9, wherein the switching circuitry is further configured to selectively allow current to flow either into or out of the first battery unit.

* * * * *